(12) United States Patent
Inoue et al.

(10) Patent No.: US 6,238,194 B1
(45) Date of Patent: May 29, 2001

(54) GOLF BALL INJECTION MOLDS

(75) Inventors: Michio Inoue; Keisuke Ihara, both of Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 09/204,062

(22) Filed: Dec. 3, 1998

(30) Foreign Application Priority Data

Dec. 3, 1997 (JP) .................................................. 9-348569

(51) Int. Cl.$^7$ ........................................................ A23G 1/22
(52) U.S. Cl. .................... 425/116; 264/278; 264/279.1; 425/120; 425/573
(58) Field of Search .................................... 264/275, 278, 264/279.1; 425/116, 117, 125, 129.1, 120, 573

(56) References Cited

U.S. PATENT DOCUMENTS

| | | | |
|---|---|---|---|
| 2,031,786 | * | 2/1936 | Oldham ................................. 425/120 |
| 2,361,348 | * | 10/1944 | Dickson et al. ....................... 425/116 |
| 4,959,000 | * | 9/1990 | Giza ....................................... 425/116 |
| 5,112,556 | * | 5/1992 | Miller .................................... 264/279 |
| 5,407,341 | * | 4/1995 | Endo et al. ............................ 425/116 |
| 5,827,548 | * | 10/1998 | Lavallee et al. ....................... 425/116 |

FOREIGN PATENT DOCUMENTS 63-199615 * 8/1988 (JP) .

* cited by examiner

*Primary Examiner*—Robert Davis
(74) *Attorney, Agent, or Firm*—Sughrue, Mion, Zinn, Macpeak & Seas, PLLC

(57) ABSTRACT

An injection mold for golf balls defines a spherical cavity therein and has a parting plane extending coplanar with the equator of the cavity. A plurality of molding material injecting gates are arranged in the mold body along or near the cavity equator, and a plurality of retractable core support pins are disposed in the mold at areas other than the cavity equator and poles so that the core support pins may be moved toward and away from the cavity center. A cover having a uniform gage and a smooth surface can be injection molded to produce a golf ball without radial misalignment of the core.

6 Claims, 5 Drawing Sheets

GOLF BALL INJECTION MOLDS

BACKGROUND OF THE INVENTION

1. Field of the Invention

This invention relates to an injection mold for the manufacture of golf balls and more particularly, to an injection mold for the consistent and efficient molding of golf balls having a concentric, uniform thin gage cover.

2. Prior Art

Golf balls having a core enclosed in a cover are conventionally manufactured by injection molding cover stock over the surface of a core in a split mold. The core is placed in the cavity of the split mold. The core is typically supported in place by support pins so that a space is defined between the cavity-defining mold surface and the core surface. The cover stock is injected into the space to mold the cover.

One exemplary prior art injection mold is illustrated in FIGS. 8 and 9, which are elevational and horizontal views in cross section of the mold, respectively. The injection mold generally designated at 1 includes upper and lower mold sections 1a and 1b which define a spherical cavity 2 therein by their wall surface 2a when mated at a parting plane or line P which extends coplanar with the equator of the cavity 2. It is understood that the cavity-defining wall surface 2a is provided with small projections for indenting dimples on the ball being molded, that is, a negative dimple pattern, though not shown.

As shown in FIG. 9, the mold 1 includes a main runner 6 which is disposed through the mold body in fluid communication with an injection molding machine, an annular runner 4 connected to the main runner, and a plurality of, eight in FIG. 9, molding material injecting gates 5 disposed through the mold body and radially extending from the annular runner 4 to the cavity 2 whereby molding material is injected from the molding machine to the cavity through the runners and gates. The mold 1 further includes a pair of vertically extending holes 8 disposed through the mold body at the north and south poles of the cavity and a pair of pins 9 received in the holes 8 to define gaps or vents 10 through which gases or volatiles evolving during molding escape to the exterior.

The mold 1 further includes a plurality of, four in FIG. 8 (total eight in both the upper and lower mold sections), column-like support pins 7 which are positioned on a circle about the hole 8 and circumferentially spaced apart by an angle of 90°, for example, for supporting a core 3 in the cavity 2. The support pins 7 each have a center axis perpendicular to the parting plane P coplanar with the cavity equator. The core 3 is held at the center of the cavity 2 by the support pins 7 in vertically opposite directions or from the upper and lower poles.

When a cover is molded over a core using the mold of the above construction, there often arise problems including eccentricity and difficulty to form a thin gage cover.

More particularly, the core is an elastic body as is the cover, the cover stock is injected under as high a pressure as 1,400 to 2,000 kg/cm², and the gates are in a planar arrangement at the parting plane. Because of the high injection pressure and the lateral or equatorial direction in which the cover stock is injected toward the core, the core is deformed and expanded in vertical or polar directions into an elliptic or rugby ball shape. Consequently, the space between the core and the wall surface of the mold near the gates is enlarged while the space near the poles is narrowed. At the end of injection, the cover stock partially solidifies before the core restores to its original spherical shape. Consequently, a cover of varying gage would be formed on the core. Particularly when a cover with a thin gage of 1 mm or less is formed around the core, the core can be locally exposed at the ball surface.

Similar problems occur even when a cover with a relatively thick gage is injection molded. Additionally, the load applied to the support pins by the injection pressure is considerably increased, resulting in radial misalignment.

SUMMARY OF THE INVENTION

Therefore, an object of the invention is to provide a novel and improved injection mold for golf balls in which support pins are disposed relative to gates so that a cover of a uniform gage can be injection molded over a core, without radial misalignment of the core, to produce a golf ball having a smooth molded surface free of weld lines and molding defects.

According to the invention, there is provided an injection mold for golf balls defining therein a spherical cavity having an equator, opposite poles and a center, the mold having a parting plane extending substantially coplanar with the equator of the cavity. A plurality of molding material injecting gates are arranged in the mold at or near positions around the cavity equator for injecting a molding material into the cavity therethrough. A plurality of retractable core support pins are disposed in the mold at areas other than the cavity equator and poles so that the core support pins may be moved toward and away from substantially the cavity center.

In one preferred embodiment, the core support pins are provided in plural pairs, and the inner ends of the core support pins in each pair are opposed to each other with respect to the cavity center. The mold may further include an additional pair of molding material injecting gates arranged in the mold substantially at the cavity poles, the core support pins being disposed near north and south latitudes 45°. Each core support pin is preferably located on a longitudinal line extending on the cavity-defining surface substantially at the middle between adjacent ones of the gates around the cavity equator. The mold may further include a corresponding plurality of holes for receiving the plurality of support pins therein, whereby gas vents are defined between the holes and the support pins.

A golf ball molded using the mold of the invention is also contemplated herein.

The invention ensures efficient molding of golf balls having a cover of a uniform gage and free of radial misalignment and also having a smooth molded surface.

With the above-described construction, the core is held at the center of the cavity, the load applied to the support pins is reduced, and gases or volatiles evolving during molding are quickly discharged to the exterior at positions where the molding material converges. Then golf balls having a smooth molded surface are efficiently molded without accompanying molding defects such as weld lines.

The three-dimensional arrangement of gates complying with the cavity shape allows the injection pressure to be uniformly distributed over the core and enables a cover with a thin gage of 1 mm or less to be molded to a uniform gage without local variation.

BRIEF DESCRIPTION OF THE DRAWINGS

These and other objects, features, and advantages of the invention will be more fully understood by reading the following description taken in conjunction with the accompanying drawings.

DETAILED DESCRIPTION OF THE INVENTION

First embodiment

Figure 1:
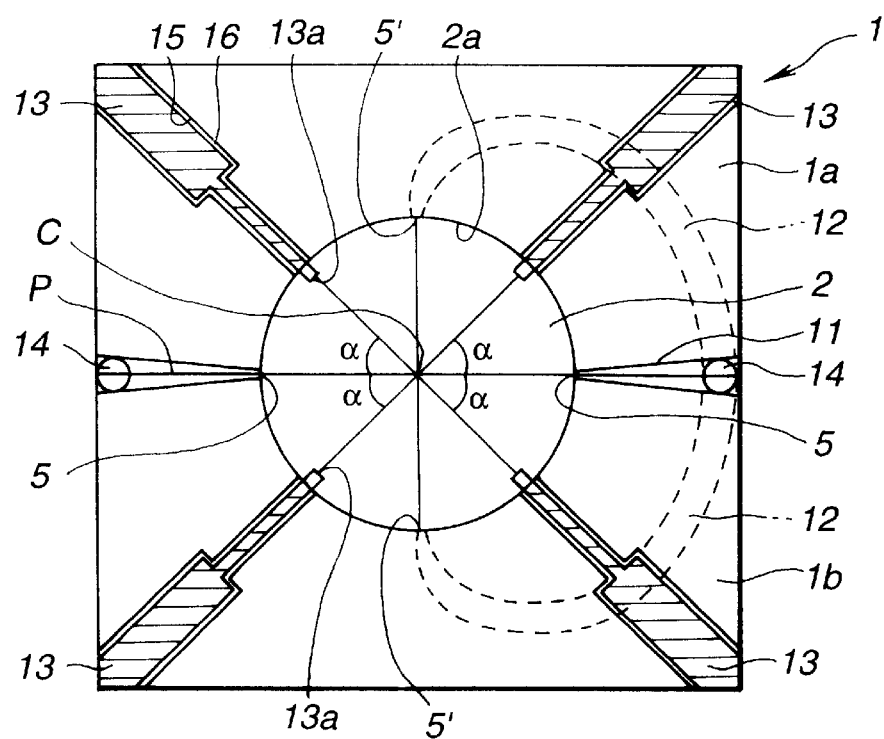
FIG. 1 is an elevational cross-sectional view of an injection mold according to a first embodiment of the invention.
Figure 2:
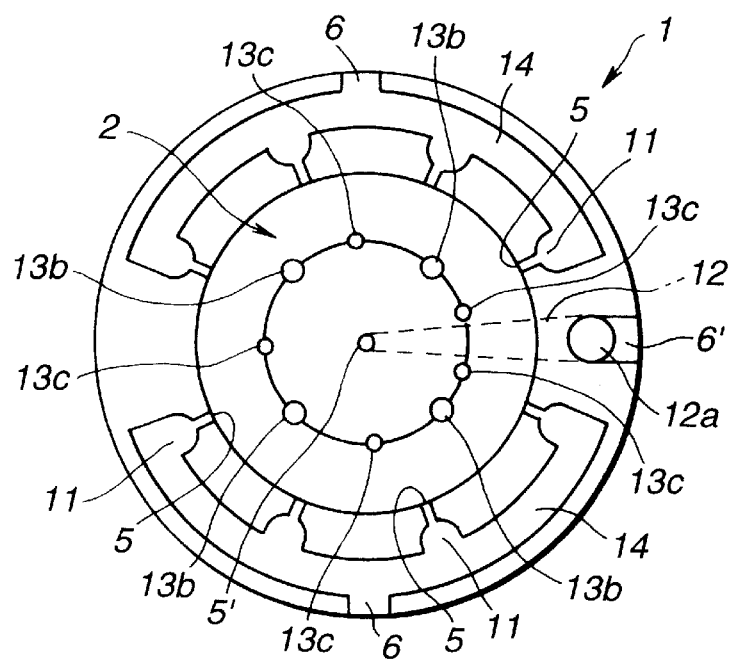
FIG. 2 is a plan view of the lower mold section of FIG. 1 as viewed from the parting plane.
Figure 8:
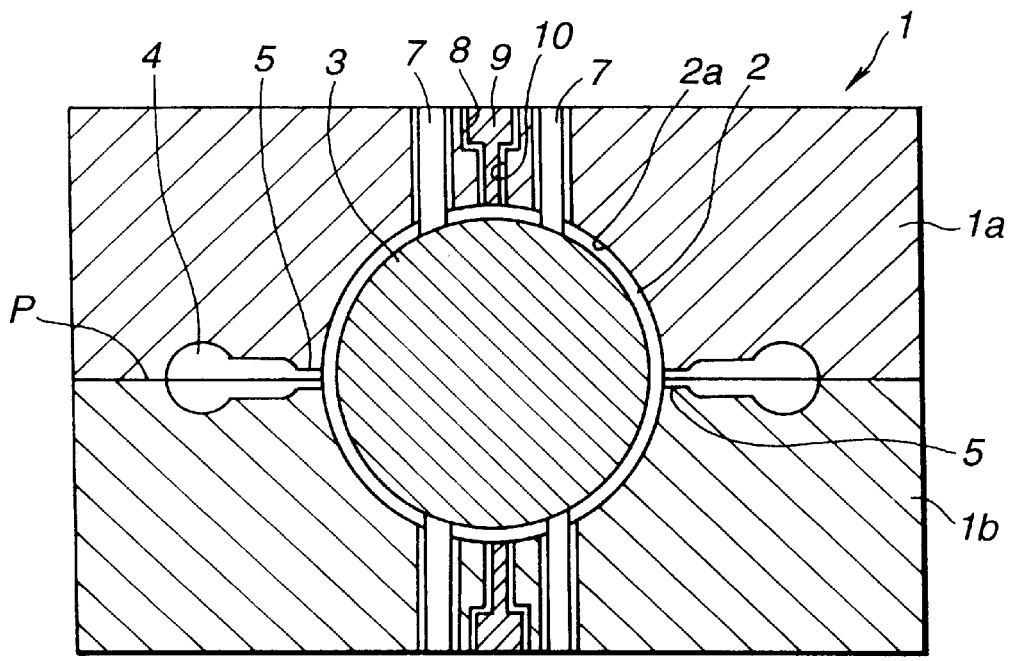
FIG. 8 is an elevational cross-sectional view of a prior art injection mold.
Figure 9:
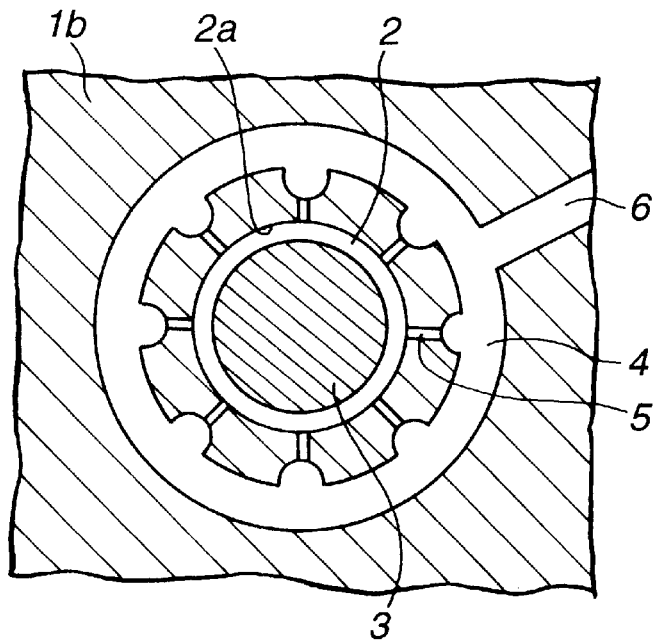
FIG. 9 is a plan view of the lower mold section of FIG. 8.

Referring to FIGS. 1 and 2, an injection mold for golf balls according to a first embodiment of the invention is described. FIG. 1 is an elevational cross-sectional view of the injection mold, and FIG. 2 is a plan view of the lower (or upper) mold section of FIG. 1 as viewed from the parting plane toward the pole. In these figures, the same parts as in FIGS. 8 and 9 are designated by the same reference numerals and their description is omitted.

The mold 1 includes upper and lower mold sections 1a and 1b which are removably mated along a parting plane or line P to define therein a hollow spherical cavity 2. The cavity 2 has an equator, opposite poles and a center C. The parting plane P extends substantially coplanar with the equator. The inner walls of the mold sections defining the cavity 2 are provided with dimple-forming projections (not shown).

As shown in FIGS. 1 and 2, the mold 1 includes a pair of main runners 6 which are disposed through the mold body at or near positions around the cavity equator in fluid communication with an injection molding machine (not shown), a pair of semi-circular runners 14 connected to the main runners, and a plurality of molding material injecting gates or nozzles 5 which are disposed through the mold body and circumferentially at equal intervals and radially extend from each runner 14 to the cavity 2. Preferably two to six gates 5 are open to the cavity on each side at or near positions around the cavity equator (totaling to four to twelve gates). In the illustrated embodiment, four gates 5 extend radially inward from each semi-circular runner 14 and are circumferentially disposed at equal intervals (totaling to eight gates).

The semi-circular runners 14 at or near positions around the cavity equator are not limited to those illustrated. For example, a single annular runner may suffice, or an annular runner may be divided into a plurality of, typically three or four, arcuate runners.

In addition to the gates 5 open at or near equatorial positions, the mold of the invention preferably includes one or more (two to four) molding material injecting gates 5' arranged in the mold body substantially at each of the cavity poles (north and south poles). Gates 5' are positioned at distal ends of second runners 12 which extend through the mold body from the parting plane P toward the opposite poles in an arcuate fashion.

More particularly, the second runners 12 each communicate to a main runner 6' through a transition 12a between the semi-circular runners 14 as shown in FIG. 2, and extend vertically upward and downward through the mold body from the parting plane P toward the opposite poles in an arcuate fashion around the cavity surface as shown in FIG. 1. The gates 5' at the distal ends of the second runners 12 open to the cavity 2 at the opposite poles in a direction perpendicular to the cavity surface 2a. The second runners 12 may be modified such that their proximal ends are connected to the semi-circular runners 14.

The conditions under which the molding material is injected through the gates can be optimized by properly adjusting the inner diameter and length of the semi-circular runners and second runners, the diameter of the gates, the injection pressure of the machine and so forth. Usually, the semi-circular runners and the second runners are formed to an approximately equal inner diameter of about 3 to 5 mm, and the gates have an inner diameter of about 0.5 to 1.0 mm.

Figure 3:
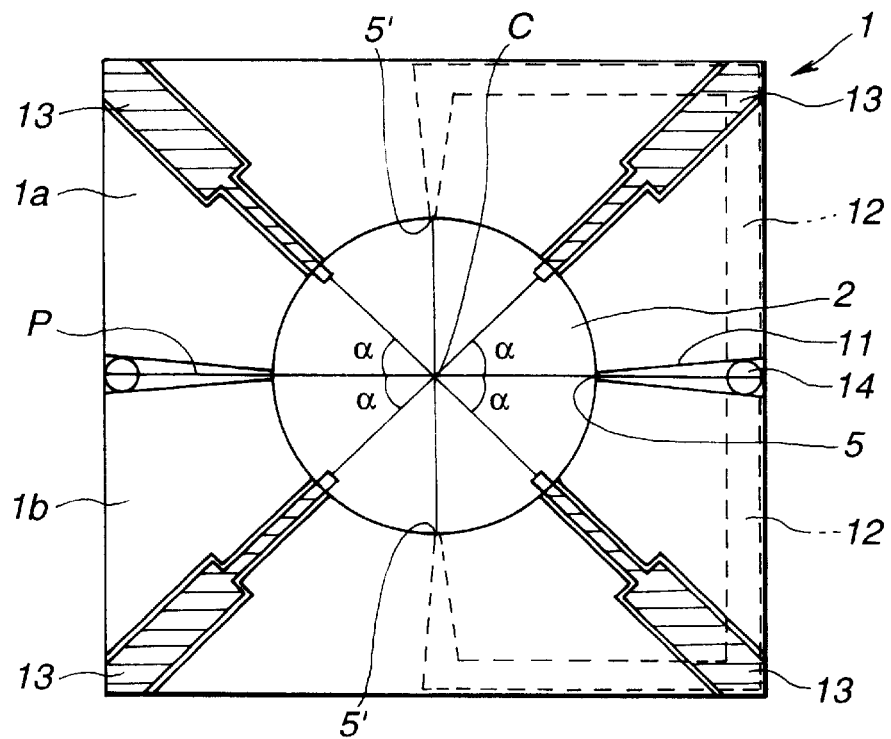
FIG. 3 is a cross-sectional view of the mold similar to FIG. 1, showing other exemplary second runners.
Figure 4:
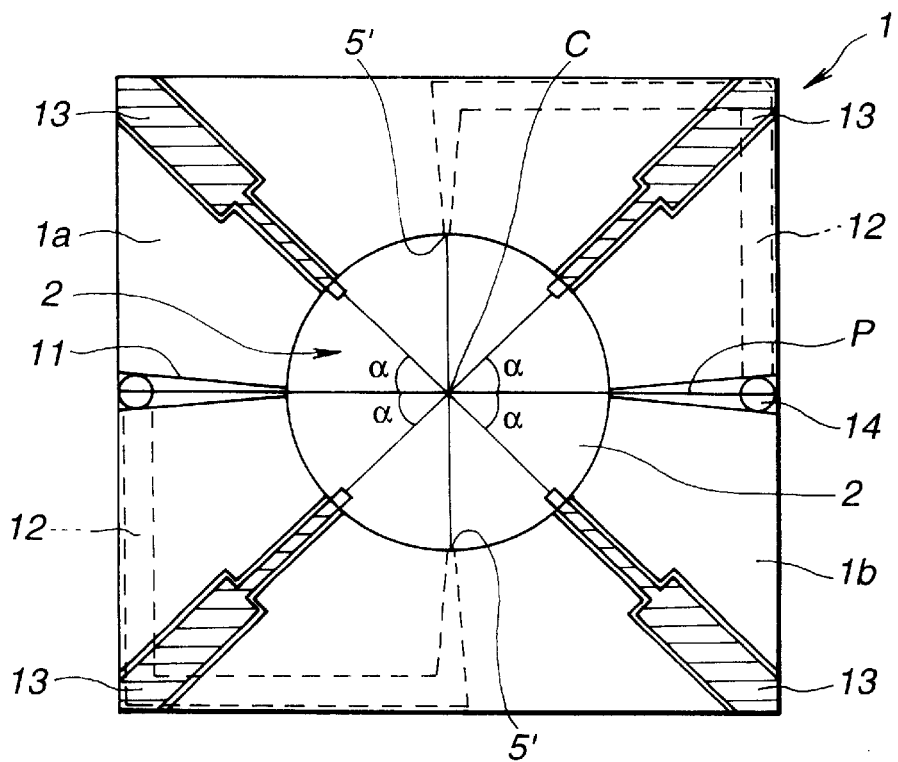
FIG. 4 is a cross-sectional view of the mold similar to FIG. 1, showing further exemplary second runners.

The second runners 12 are not limited to those shown in FIGS. 1 and 2. For example, as shown in FIG. 3, two second runners 12 of U-shape may be provided each of which extends vertically upward or downward from the parting plane P or one semi-circular runner 14, then horizontally and again vertically downward or upward toward the pole. Also, as shown in FIG. 4, two second runners 12 are located at diametrically opposed positions of the semi-circular runners 14, with each second runner 12 having a U-shape extending vertically from the parting plane P or the corresponding semi-circular runner 14, then running horizontally and again vertically toward the pole. One second runner 12 first extending vertically upward has at its distal end a gate 5' opening at the north pole while the other second runner 12 first extending vertically downward has at its distal end a gate 5' opening at the south pole.

Figure 5:
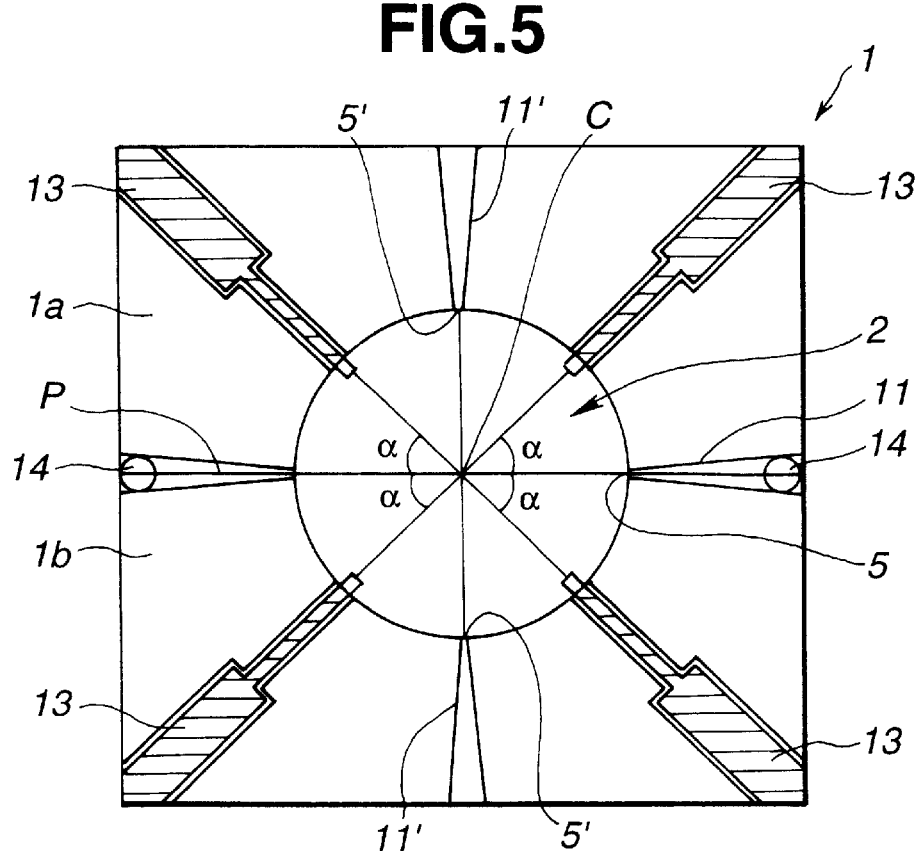
FIG. 5 is a cross-sectional view of the mold similar to FIG. 1, showing still further exemplary second runners.

Instead of the second runners 12 vertically diverting from the parting plane P, nozzle-shaped runners 11' each having a gate 5' at a distal end thereof may be used as shown in FIG. 5. Each nozzle-shaped runner 11' extends from a route different from the semi-circular runners 14 at the parting plane P to the north or south pole of the cavity 2 where the gate 5' opens to the cavity 2.

Except for the location of the second runners and gates associated therewith, the embodiments shown in FIGS. 3 to 5 have the same construction as the embodiment of FIGS. 1 and 2.

In the injection mold of the invention, a plurality of gates open to the cavity at or near positions around the cavity equator and preferably, additional gates open to the cavity at or near the opposite poles, for providing a steric gate arrangement more adapted to the cavity geometry. Then, the injection pressures of molding material portions through the gates are in equilibrium during injection so that the core is kept substantially at the center of the cavity. This ensures that a golf ball having a cover of a uniform thickness is molded without radial misalignment.

Further, the injection mold of the invention includes a plurality of retractable core support pins disposed in the mold body at areas other than the cavity equator and poles so that the core support pins may be moved toward and away from substantially the cavity center. Preferably, the core support pins are provided in plural pairs such that the inner ends of the core support pins in each pair may be opposed to each other with respect to the cavity center. In the embodiment wherein an additional pair of molding material injecting gates are arranged in the mold body substantially at the cavity poles, the core support pins are preferably disposed near north and south latitudes 45°.

Specifically, in areas of the cavity-defining surface excluding the equator and opposite poles (or north and south poles) that are disposed in proximity to an angle $\alpha=45°$ relative to the parting plane P including the equator (that is, north latitude 45° and south latitude 45°), preferably areas within $\alpha=40°$ to 50°, plural pairs, preferably four to ten pairs, of core support pins 13 are disposed for the upper and lower mold sections so that the core support pins 13 may be moved toward and away from the cavity center C.

In the embodiment of FIGS. 1 and 2, nine core support pins 13 are located on a north or south latitude line with $\alpha=45°$. Each core support pin 13 has a center axis passing the center C of the cavity. The core support pins 13 are paired between the upper and lower mold sections 1a and 1b and have distal or radially inner ends 13a which are diametrically opposed to each other. The core support pins 13 are paired such that the core support pin 13 in the upper mold section 1a is aligned with the core support pin 13 in the lower mold section 1b. The mold consisting of the upper and lower mold sections has nine pairs of core support pins (18 pins in total). Each support pin 13 is received in a hole 15 disposed through the mold body.

The core support pins 13 function as follows. When protruded into the cavity 2 as shown in FIG. 1, the core support pins 13 hold the core 3 exactly at the center of the cavity. When retracted into the mold body, the core support pins 13 at their distal ends form the same projections as the dimple-forming projections (not shown) on the cavity-defining surface so that dimples may be indented in the surface of the ball being molded. Any well-known mechanism may be used as the means for driving the support pins, though not shown.

The support pins preferably have a circular cross-sectional shape corresponding to the planar shape of dimples. Often the support pin is a stepped cylinder including a large diameter section from the rear end to an intermediate and a slender section from the intermediate to the distal end. The support pin 13 of this structure is advantageous in that when the support pin 13 is retracted from within the cavity, a greater gap 16 is available between the hole 15 and the pin 13, permitting gases or volatiles to be quickly discharged from within the cavity during molding. Of course, cylindrical support pins having an equal diameter are acceptable.

In the embodiment of FIGS. 1 and 2, two types of core support pins having different diameters are used. Those support pins 13b with a large diameter have distal ends adapted to indent large-diameter dimples in the ball surface, and those support pins 13c with a small diameter have distal ends adapted to indent small-diameter dimples in the ball surface. In the illustrated embodiment, the upper and lower mold sections each have four large support pins 13b and five small support pins 13c, which are alternately arranged at substantially equal intervals in a circumferential direction as best shown in FIG. 2, with the exception that small support pins 13 are adjacent to each other only at the position of the second runner 12 communicating to the gate 5' open at the pole. Usually, the thick support pins 13b have a diameter of about 2 to 4 mm (corresponding to the diameter of large dimples) and the thin support pins 13c have a diameter of about 1 to 2 mm (corresponding to the diameter of small dimples). The distance over which the support pins are protruded or retracted from the molding surface is usually about 0.5 to 5.0 mm.

In the mold of the invention, the core support pins 13 are preferably positioned on longitudinal lines that are traced on the cavity-defining surface to pass substantially the middle between adjacent gates 5 and 5 at or near the positions around the cavity equator. The reason is that when molding material is injected through the respective gates, the molding material initially flows and diffuses through the space between the core and the cavity-defining surface in a concentric fashion about each gate. The molding material portions injected from adjacent gates at the equator then merge with each other. The weld line formed therebetween proceeds toward the opposite poles along a longitudinal line that extends on the cavity-defining surface substantially at the middle between the adjacent gates. Gases or volatiles evolving during injection migrate along the weld lines. The positioning of the support pins at the weld lines facilitates discharging of the gases or volatiles through the gaps or gas vents 16 between the support pins 13 and the holes 15.

Figure 6:
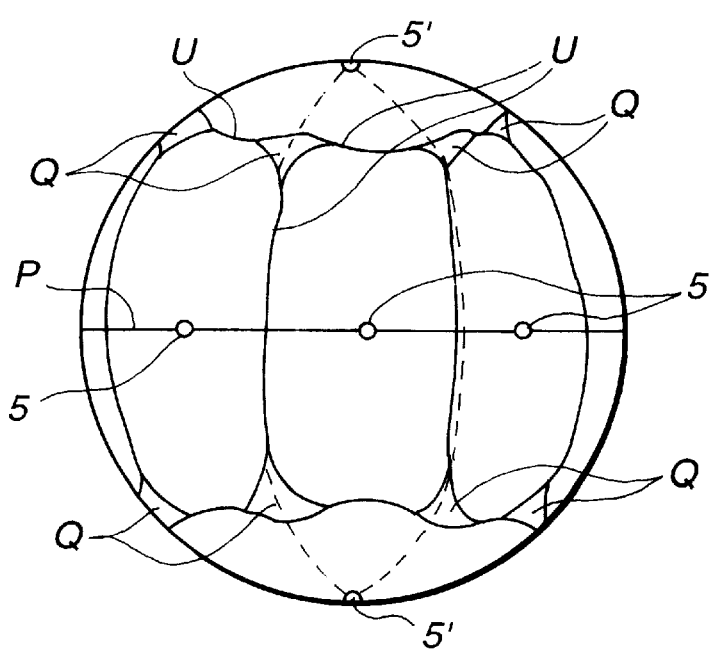
FIG. 6 is an imaginary side view of the spherical cavity of the mold of FIG. 1 at the end of molding.

In fact, when golf balls are molded using the mold shown in FIGS. 1 and 2, as shown in the imaginary view of FIG. 6, molding material portions injected from adjacent gates 5 at the equator form weld lines U which longitudinally extend in the cavity while molding material portions injected from the gates 5' at the opposite poles flow and diffuse in a concentric fashion toward the equator and eventually merge with the longitudinally extending weld lines U near positions having an angle $\alpha$ of approximately 45° (positions Q: north and south latitudes 45°). As a result, gases gather and stagnate at the positions Q in FIG. 6.

The positions Q where the weld lines converge are practically at an angle $\alpha$ of 45° (north and south latitudes 45°), preferably within the range of $\alpha=40°$ to 50°, though the exact position depends on the balance of molding material injected from all the gates at the equator and opposite poles.

Where support pins are located at the positions Q where the weld lines converge, gases or volatiles evolving during molding can be efficiently discharged through the gaps or vents between the support pins and the holes, preventing weld lines and molding defects from occurring. Thus a smooth molded surface is obtained.

Second embodiment

Figure 7:
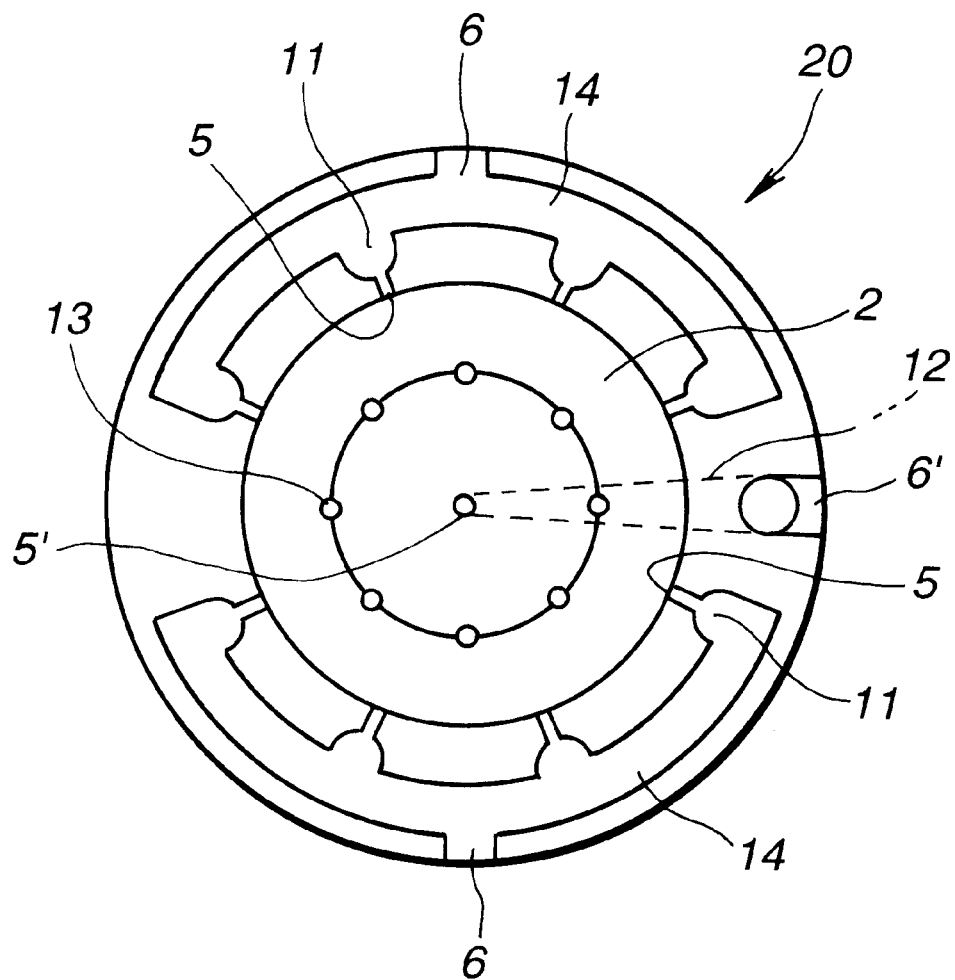
FIG. 7 is a plan view of a lower mold section of a mold according to a second embodiment of the invention as viewed from the parting plane.

FIG. 7 is a plan view of a lower or upper mold section of an injection mold according to a second embodiment of the invention as viewed from the parting plane toward the pole. The mold according to the second embodiment, generally designated at 20, is characterized in that the second runner 12 extending to the gate 5' at the pole is spaced apart from the cavity 2 so as to avoid any obstruction against the location of the core support pins and that eight pairs of (total 16) equidistantly spaced support pins 13 having a common diameter of about 1 to 4 mm are disposed in the upper and lower mold sections. More specifically, all the support pins 13 are disposed such that their distal ends are positioned at the intersections between longitudinal lines extending at the middle between adjacent ones of the gates 5 at the equator and latitudinal lines having an angle $\alpha=45°$ and that the distal end of one support pin in the upper mold section is diametrically opposed to the distal end of the corresponding support pin in the lower mold section. It is noted that the distal ends of the support pins form dimple-forming projections as in the first embodiment.

The distance between the cavity and the second runner 12 extending to the gate 5' at the pole may be relatively small insofar as the second runner 12 is bent or curved to bypass the positions Q.

When molding is effected using the mold of the second embodiment, the side elevation of the filled cavity has weld lines converging at positions Q near north and south latitudes 45° as in FIG. 6.

When a cover is injection molded around a core using the injection mold of the invention, the injection molding procedure and conditions are not critical and conventional procedures may be used. One exemplary procedure of injection molding a cover around a core using the injection mold of FIGS. 1 and 2 is described. With the upper and lower mold sections 1a and 1b removably mated as shown in FIG. 1, the core is held in place by protruding radially inward the support pins 13 at north and south latitudes 45°. In this condition, a molding material is injected from an injection molding machine (not shown) into the space between the core 3 and the cavity surface 2a through the main runners 6, semi-circular runners 14 and second runners 12, and sterically arranged gates 5 and 5' opening at the equator and opposed poles of the cavity 2. Immediately before or at the same time as the completion of injection, the support pins 13 are retracted to be flush with the cavity surface. In this way, the cover is molded around the core to form a golf ball.

The molding material for the cover is not critical. There may be used any of cover stocks commonly used in the manufacture of golf balls by injection molding, for example, thermoplastic resins.

Whether the cover has an extremely thin gage of less than about 1 mm or a relatively thick gage of about 2 to 3 mm, golf balls can be molded in the inventive mold with advantages including a reduced load on the support pins, a uniform thickness of the cover, and minimized radial misalignment of the core.

Since support pins are located at positions where molding material portions from respective gates merge in the cavity, gases or volatiles gathering at these positions are quickly discharged through the gaps or vents between the support pins and the support pin-receiving holes, minimizing the occurrence of molding defects such as weld lines. The golf balls molded using the inventive mold have a smooth molded surface.

Although the injection mold of the invention is suitable when a cover is formed around a core, the invention is also applicable when an intermediate layer is formed around a core. In this case, no dimple-forming projections are patterned on the cavity-defining surface and the distal ends of the support pins are formed substantially flat rather than convex. The inventive mold may also be used in the molding of one-piece golf balls. The structure of golf balls molded using the injection mold of the invention is not critical and they may be either wound golf balls or solid golf balls.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An injection mold for golf balls comprising:

a mold having a spherical cavity having an equator and opposite poles, a mold parting plane extending substantially coplanar with the equator of the cavity, a plurality of molding material injecting gates arranged in the mold at or near positions around the cavity equator at equal intervals for injecting a molding material into said cavity therethrough, an additional pair of molding material injecting gates arranged at the cavity poles, and a plurality of retractable core support pins each of which is received in a hole disposed through the mold, wherein a gap is formed between the hole and the pin permitting gases to be quickly discharged from within the cavity during molding, and each core support pin received in the hole is positioned at a portion at which a diffused molding material injected from the gate at each pole merges with molding materials injected from the adjacent gates at the cavity equator and flowing on a weld line formed therewith.

2. The injection mold of claim 1 wherein the mold comprises with the upper and lower mold sections separably mated at the parting plane and the core support pins are paired into four to ten pairs between the upper and lower mold sections and have distal or radially inner ends which are diametrically opposed to each other.

3. The injection mold of claim 2 wherein the core support pins are disposed in a portion to an angle of 40° at 50° relative to the parting plane.

4. The injection mold of claim 1 wherein the core support pins and the pins received holes have a relatively large diameter section from rear and to an intermediate and a slender section from the intermediate section to the distal end.

5. The injection mold of claim 1 wherein the core support pins are composed of a type having a large diameter distal end of 2 to 4 mm and another type having small diameter distal end of 1 to 2 mm.

6. The injection mold of claim 5 wherein the large diameter distal ends of the core support pins have a shape corresponding to the diameter of the large dimples and the small diameter distal ends of the core support pins have a shape corresponding to the diameter of small dimples.

* * * * *